Nov. 14, 1961  A. S. A. STOHLMANN, JR  3,008,527
SOIL AERATOR
Filed May 17, 1957  2 Sheets-Sheet 2
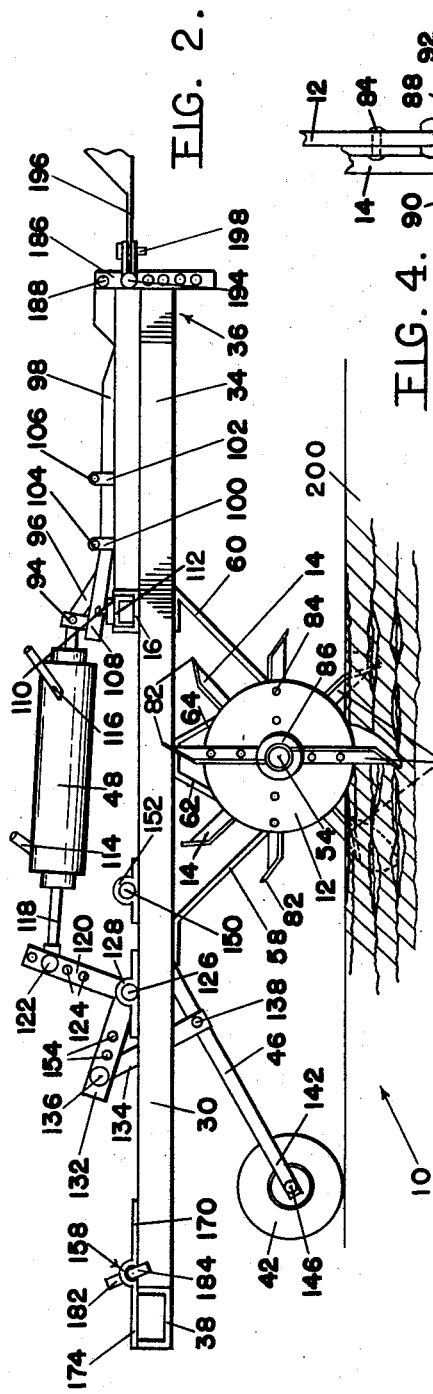
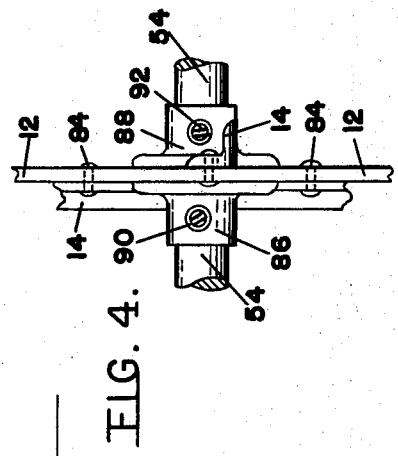
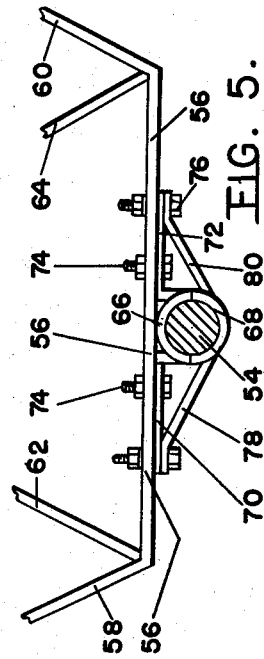
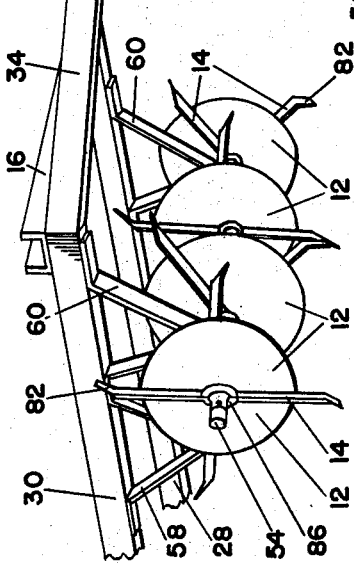
A.S.A. STOHLMANN, JR.
*INVENTOR.*
BY *Arthur H. Sturges*
*Attorney*

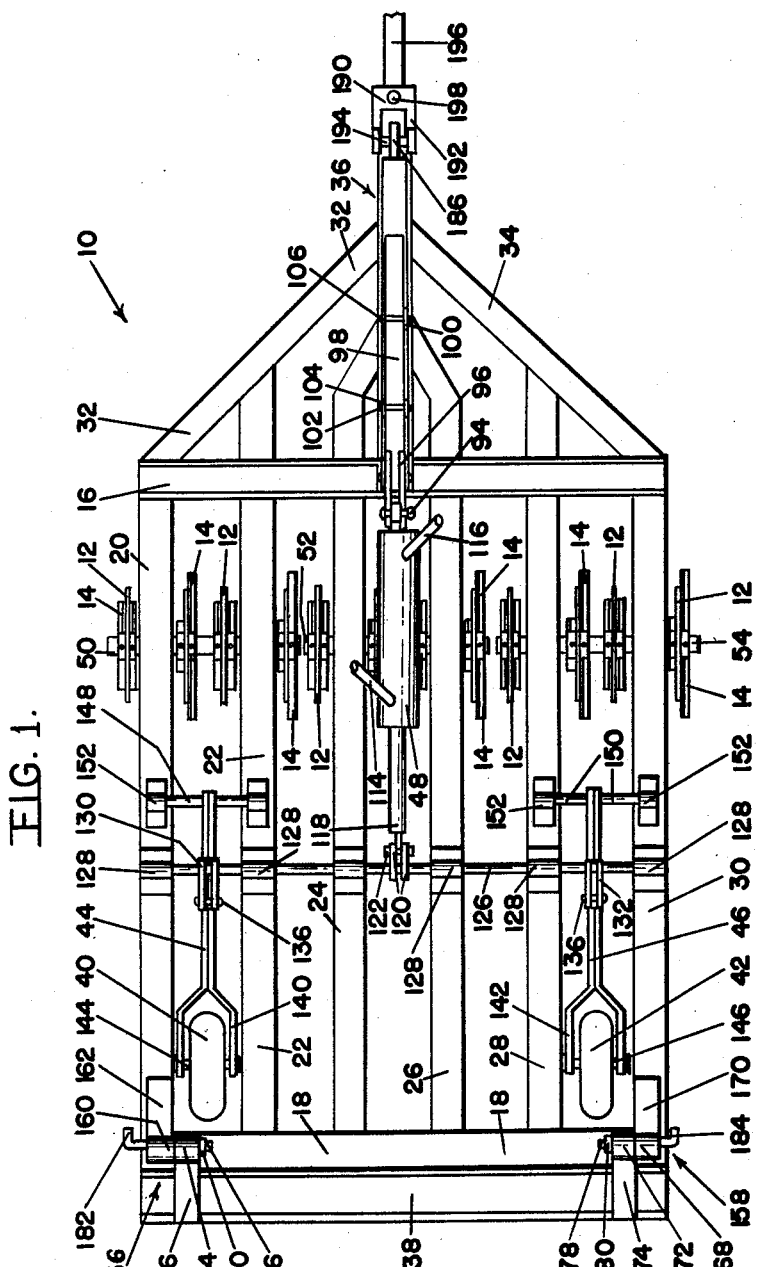

United States Patent Office 3,008,527
Patented Nov. 14, 1961

3,008,527
SOIL AERATOR
August S. A. Stohlmann, Jr., Louisville, Nebr.
Filed May 17, 1957, Ser. No. 659,900
3 Claims. (Cl. 172—556)

This invention relates to soil conditioning equipment and implements particularly designed to open the subsoil, and in particular a plurality of debris chopping discs suspended from a horizontally disposed frame with radially disposed teeth on the discs and with points of the teeth extended a sufficient distance from the peripheries of the discs to penetrate the subsoil with the discs traveling on the surface of the soil whereby the hard subsoil is opened to air and moisture and wherein roots of plants may travel downwardly a considerable distance.

The purpose of this invention is to provide a machine for cutting debris on the surface of the ground and opening the subsoil in a single operation.

In cultivating farm lands the soil is plowed to substantially the same depth year after year and the subsoil remains dormant making penetration thereof by water substantially impossible. It is desirable to bring these dormant areas to the surface and to penetrate the ground immediately adjacent the soil so as to allow rainwater to seep further into the ground.

With this thought in mind this invention contemplates a horizontally disposed frame having discs with teeth extended from the peripheral edges thereof rotatably mounted in hangers depending from the under surface with hydraulically actuated ground engaging wheels carried by arms pivotally mounted in the frame and formed to be actuated to regulate the penetration of the teeth into the subsoil and also to elevate the discs and teeth for transportation.

The object of this invention is to provide a machine for opening the subsoil to facilitate penetration of water into the ground.

Another object of the invention is to provide a machine for breaking through the subsoil in which the machine is provided with sharp discs for cutting corn stalks and other debris so that the stalks and debris may be worked into the ground.

Another important object of the invention is to provide a subsoil working machine in which the penetration of prongs thereof is regulated from the seat of a towing tractor.

It is yet another object of the invention to provide a subsoil penetrating machine in which a vertically adjustable hitch is provided on the leading end for further regulating the penetration of prongs thereof into the subsoil.

A further object of the invention is to provide a subsoil working machine in which the soil engaging elements are mounted in units so that as many units as may be desired may be assembled in a frame.

A still further object is to provide a subsoil working machine in which corn stalk and debris cutting elements are combined with subsoil penetrating prongs whereby chopped corn stalks straw, and other debris become emulsified into the soil in which the machine is of a simple and economical construction.

With these and other objects and advantages in view the invention embodies a horizontally disposed frame having spaced longitudinally positioned beams with a vertically adjustable hitch positioned on the forward end and a channel providing a weight hinged to the trailing end, discs having prongs extended from the peripheral edges carried by shafts rotatably mounted in hangers depending from the beams, support wheels rotatably mounted in arms pivotally mounted on the frame, and a hydraulic cylinder also mounted on the frame and operatively connected to the support wheels for adjusting the elevation of the frame.

Other features and advantages of the invention will appear from the following description taken in connection with the drawings, wherein:

FIGURE 1 is a plan view of the improved subsoil aerator and debris emulsifier.

FIGURE 2 is a side elevational view of the machine showing prongs of the discs extended into the subsoil of a field.

FIGURE 3 is a view illustrating the mounting of the discs and teeth or prongs on the under surface of the frame of a machine.

FIGURE 4 is an edge elevational view of one of the discs with the prongs thereon and with parts of the disc, prongs, and shaft on which the disc is mounted broken away, the parts being shown on an enlarged scale.

FIGURE 5 is a side elevational view of one of the shaft carrying hangers with the parts shown on an enlarged scale, with upper parts of the hanger broken away, and with the shaft mounted thereon shown in section.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a disc having prongs 14 with arcuate points mounted thereon, numeral 16 a transversely disposed beam or front rail at the forward end of the frame of the machine, numeral 18 a similar beam or rear rail on the rear end of the frame, numerals 20 and 22, 24 and 26, and 28 and 30 longitudinally disposed beams extended between the cross or transverse beams 16 and 18, numerals 32 and 34 converging beams extended from the forward ends of the side beams 20 and 30, numeral 36 a channel bar to which the forward ends of the beams 32 and 34 are connected and which provides a mounting for the hitch, numeral 38 a channel bar extended across the rear of the frame providing a weight, and numerals 40 and 42 ground engaging or support wheels pivotally mounted by arms 44 and 46 in the intermediate part of the frame and actuated by a hydraulic cylinder 48.

The transverse and longitudinally disposed beams are secured together by suitable means, such as by welding, and the forward ends of the beams 22 and 28 are secured to the beams 32 and 34, as shown in FIGURE 1. The forward ends of the beams 24 and 26 are secured by similar means to the beam 36.

The discs 12 with the prongs 14 extended therefrom are positioned in groups with discs on each side of each beam, and the discs are mounted on disc shafts or spindles 50, 52, and 54, which are rotatably mounted on horizontally disposed bars 56 of the hangers. The ends 58 and 60 of the hangers extend upwardly with flanges on ends thereof secured to under surfaces of the longitudinally disposed beams, such as by welding. The hangers are also provided with braces 62 and 64, the upper ends of which are also secured, such as by welding, to under surfaces of the beams.

The shafts on which the discs are mounted are rotatably mounted on the bars 56 of the hangers with bearings having bases 66 and caps 68, and, as shown in FIGURE 5, flanges 70 and 72 of the bases are secured to the bars 56 by bolts 74 and 76, the bolts 76 extending through flanges on the ends of arms 78 and 80 extending from the caps of the bearings.

The prongs 14, which are formed with arcuate outer ends 82, are secured to the discs with fasteners, such as the rivets 84, and as the points wear the prongs are removed, repaired or sharpened, and replaced on the discs. The discs are also designed to be removed and sharpened, or sharpened in position upon the shafts. The discs are provided with hubs 86 and 88 and set screws 90 and 92 threaded in the hubs provide means for retaining the discs in adjusted positions upon the shafts.

The hydraulic cylinder 48 is pivotally mounted by a stud 94 on a web 96 extended from a channel bar 98, and the channel bar is clamped between ears 100 and 102 on the beam 36 by bolts 104 and 106 extended through the ears. An upwardly extended end 108 of the channel bar rests upon a plate 110 on a channel bar 112 positioned in the channel bar 16.

The hydraulic cylinder 48, which is provided with fluid pressure connections 114 and 116, is provided with a piston having a piston rod 118, extended from the end opposite to the end pivotally connected to the channel bar 98, and the piston rod is pivotally connected to an arm 120 by a pin 122 which extends through one of the openings 124 in the arm and also through sections of a clevis on the piston rod. The arm 120 is integrally secured to a rocker shaft 126 rotatably mounted on the longitudinally disposed beams by bearings 128.

The shaft 126 is provided with pairs of bars 130 and 132 which are connected by links 134 to the support wheel carrying arms 44 and 46, the links being pivotally connected to the pairs of bars with pins 136 and to the arms 44 and 46 by pins 138. The arms 44 and 46 are formed with yokes 140 and 142 and the support wheels 40 and 42 are rotatably mounted in the yokes on shafts 144 and 146. The arms 44 and 46 are pivotally mounted on shafts 148 and 150 mounted in bearings 152 on the beams 20 and 22, and 28 and 30. The arm 120 is provided with tthe spaced openings 124 to facilitate adjusting the position of the hydraulic cylinder, and the pairs of bars 130 and 132 are provided with similar openings 154 to further adjust the positions of the supporting wheels 40 and 42.

The channel bar 38 is pivotally mounted on the rear of the frame by bearings 156 and 158, the bearing 156 having a hub 160 mounted on the side beam 20 by a hinge plate 162, and a hub 164 mounted on the channel bar 38 with a plate 166, and the bearing 158 having a hub 168 mounted on the side beam 30 with a plate 170 and a hub 172 mounted on the channel bar by a plate 174. The hubs 160 and 164 are pivotally connected by a hinge pin 176 and the hubs 168 and 172 by a hinge pin 178. The inner ends of the pins are provided with nuts 180 and the outer ends with extended ends 182 and 184 to facilitate removing the pins when it is desired to remove the channel bar 38. With the channel bar in position it is readily turned over about the hinges so that it may be placed upon the frame of the machine.

The hitch includes a vertically disposed bar 186 having spaced openings 188 therein mounted on the end of the beam 36, and a clevis 190 having arms 192 secured on the bar by a pin 194 extended through ends of the arms of the clevis and through one of the openings 188 and the clevis is provided with a bifurcated end in which a draw-bar 196 is secured by a pin 198.

Operation

With the parts assembled as illustrated and described the draw-bar of a tractor is connected to one of the openings of the vertically disposed bar 186 on the end of the hitch bar 36 depending upon the elevation of the frame of the machine, and as the machine is towed over the ground, which is indicated by the numeral 200, the discs chop corn stalks and other debris on the surface of the ground with the prongs penetrating the subsoil, as shown in FIGURE 2. The depth to which the subsoil is penetrated by the prongs is controlled by the hydraulic cylinder which may be operated from the seat of the towing tractor whereby the wheels 40 and 42 may be raised and lowered, as desired. Further adjustments in the relation of the discs and prongs to the soil are made by connecting the piston rod of the cylinder 48 to different openings in the arm 120, and also by connecting the links 134 to different openings in the bars 130 and 132.

Where the subsoil is hard and encrusted the movement of the prongs therethrough cracks and fractures the soil for a considerable distance on each side of the discs thereby opening the subsoil to moisture so that the moisture rapidly penetrates downwardly into the soil.

The discs are provided in units of four and as many units may be provided as may be desired may be assembled in one machine. The cross members and evener frame at the front are extended when more units of discs are required, or contracted when a single disc unit, as shown in the drawings, is used.

After use the wheels 40 and 42 are forced downwardly by the cylinder 48 through the arm 120, the bars 130 and 132, and links 134 on the continuous shaft 126 until the prongs or teeth are elevated above the ground to facilitate towing the machine from one field to another and for transportation.

From the foregoing specification, it will be apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and arrangement of details and parts such as come within the purview of the invention claimed may be resorted to in actual practice, if desired.

Having now described the invention that which is claimed to be new and desired to be procured by Letters Patent, is:

1. A soil aerator and trash chopper comprising: an elongated frame having means at its forward end for facilitating attachment to a towing vehicle, a plurality of laterally spaced discs mounted in a lateral row rotatably on said frame for rotation in planes parallel to the line of draft, the peripheries of said discs being sharp enough to chop ground-surface trash during rotation in chopping positions, teeth attached to and extending generally radially outwardly from said discs, said teeth being four in number per disc and having outer ends spaced approximately ninety degrees apart so that only two teeth are in the ground at any one time, the rearward end of said frame having a weight means thereon disposed sufficiently far from said discs for said weight means to press said teeth into the ground with good leverage, wheels for supporting said frame, and means for attaching said wheels to said frame and for raising and lowering said wheels with respect to said frame to raise and lower said discs.

2. A soil aerator and trash chopper comprising: an elongated frame having means at its forward end for facilitating attachment to a towing vehicle, a plurality of laterally spaced discs mounted in a lateral row rotatably on said frame for rotation in planes parallel to the line of draft, the peripheries of said discs being sharp enough to chop ground-surface trash during rotation in chopping positions, teeth attached to and extending generally radially outwardly from said discs, said teeth being four in number per disc and having outer ends spaced approximately ninety degrees apart so that only two teeth are in the ground at any one time, said teeth each being substantially radially extending and straight in those portions which protrude beyond and are adjacent to said discs respectively, the outermost end of each of said teeth being inclined forwardly at an obtuse angle with respect to the remainder of the respective tooth for providing a pocket digging effect in which loose dirt tends to substantially fill the pockets, the rearward end of said frame having a weight means thereon disposed sufficiently far from said discs for said weight means to press said teeth into the ground with good leverage and specifically being spaced at least approximately as far to the rear of said discs as the forward end of said frame is from said discs, wheels for supporting said frame, and means for attaching said wheels to said frame and for raising and lowering said wheels with respect to said frame to raise and lower said discs.

3. The combination of claim 2 in which said frame has horizontal side members on each side extending from points disposed forwardly of said discs substantially to the rearward end of said frame.

References Cited in the file of this patent

UNITED STATES PATENTS

| | | |
|---|---|---|
| 442,538 | Parker | Dec. 9, 1890 |
| 634,825 | Mallon | Oct. 10, 1899 |
| 1,044,404 | Magill | Nov. 12, 1912 |
| 1,085,231 | Wolf | Jan. 27, 1914 |
| 2,195,631 | Post et al. | Apr. 2, 1940 |
| 2,243,241 | Burns | May 27, 1941 |
| 2,614,375 | Calkins | Oct. 21, 1952 |
| 2,637,564 | Stratman | May 5, 1953 |
| 2,778,291 | Kerns | Jan. 22, 1957 |
| 2,812,701 | Weaver | Nov. 12, 1957 |
| 2,826,132 | Kirchoff | Mar. 11, 1958 |